United States Patent [19]
Duncan

[11] Patent Number: 6,138,401
[45] Date of Patent: Oct. 31, 2000

[54] FISH HOOK REMOVER

[76] Inventor: Franklin R. Duncan, P.O. Box 785, Otis Orchards, Wash. 99027

[21] Appl. No.: 09/344,006

[22] Filed: Jun. 25, 1999

[51] Int. Cl.$^7$ .................................................. A01K 97/18
[52] U.S. Cl. ............................................ 43/53.5; 81/488
[58] Field of Search ................................ 43/53.5; 81/488

[56] References Cited

U.S. PATENT DOCUMENTS

| | | | |
|---|---|---|---|
| 1,957,799 | 5/1934 | Peterson | 43/53.5 |
| 2,441,458 | 5/1948 | Underwood | 43/53.5 |
| 2,781,599 | 2/1957 | Steiner | 43/53.5 |
| 3,377,735 | 4/1968 | Daughtry | 43/53.5 |
| 4,914,853 | 4/1990 | Swindle | 43/53.5 |
| 5,644,865 | 7/1997 | Harrison et al. | 43/53.5 |

OTHER PUBLICATIONS

"Cabela's Long Arm Lure Retriever," Cabela's Spring Annual Catalog 99, p. 45.

*Primary Examiner*—Jack W. Lavinder
*Attorney, Agent, or Firm*—Wells, St. John, Roberts, Gregory & Matkin, P.S.

[57] ABSTRACT

A fish hook remover is described which provides a handle that may include a shank having a spiral hook engaging flight. The spiral hook engaging flight is generated about an axis with a central hook shank receiving opening. A spiral line guide opening is defined by the flight that spirals into the central hook shank receiving opening such that a fish line engaged laterally by the flight will be guided into the central hook shank receiving opening.

20 Claims, 4 Drawing Sheets

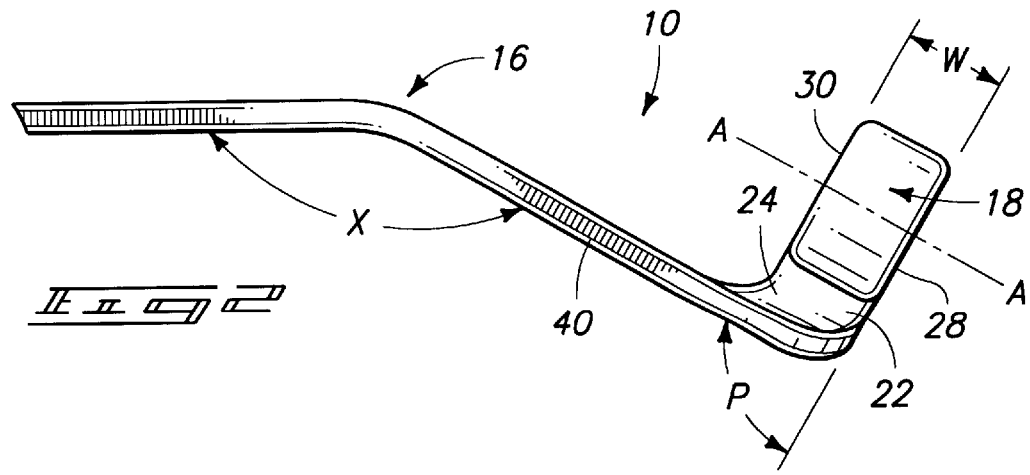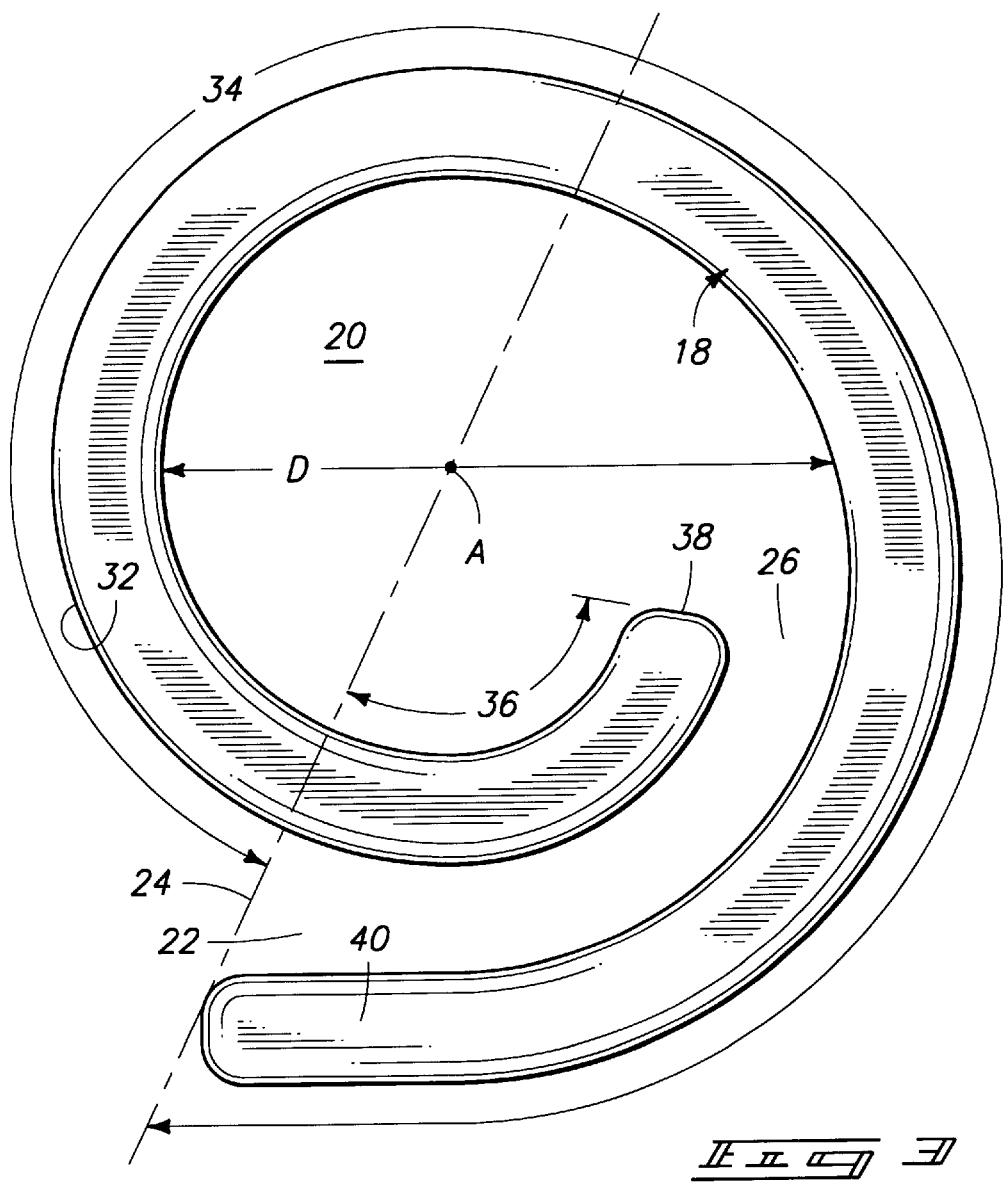

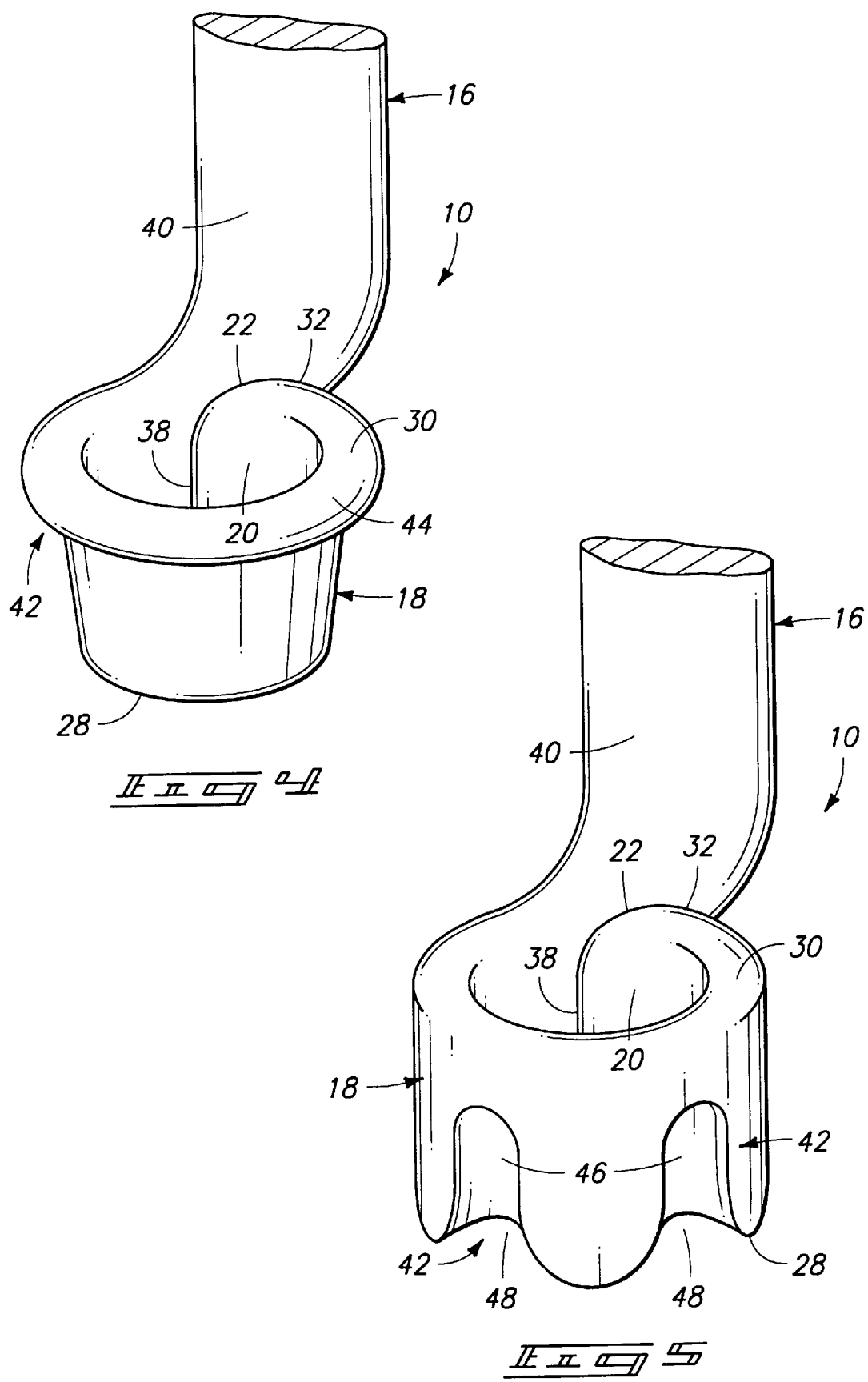

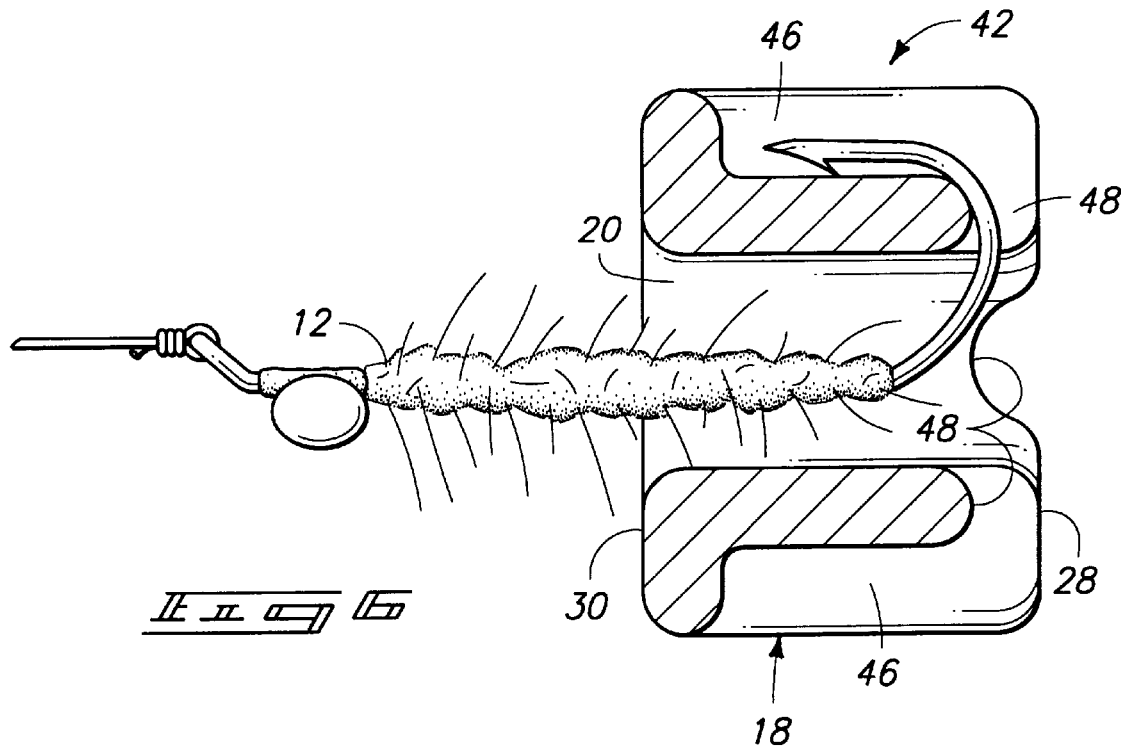
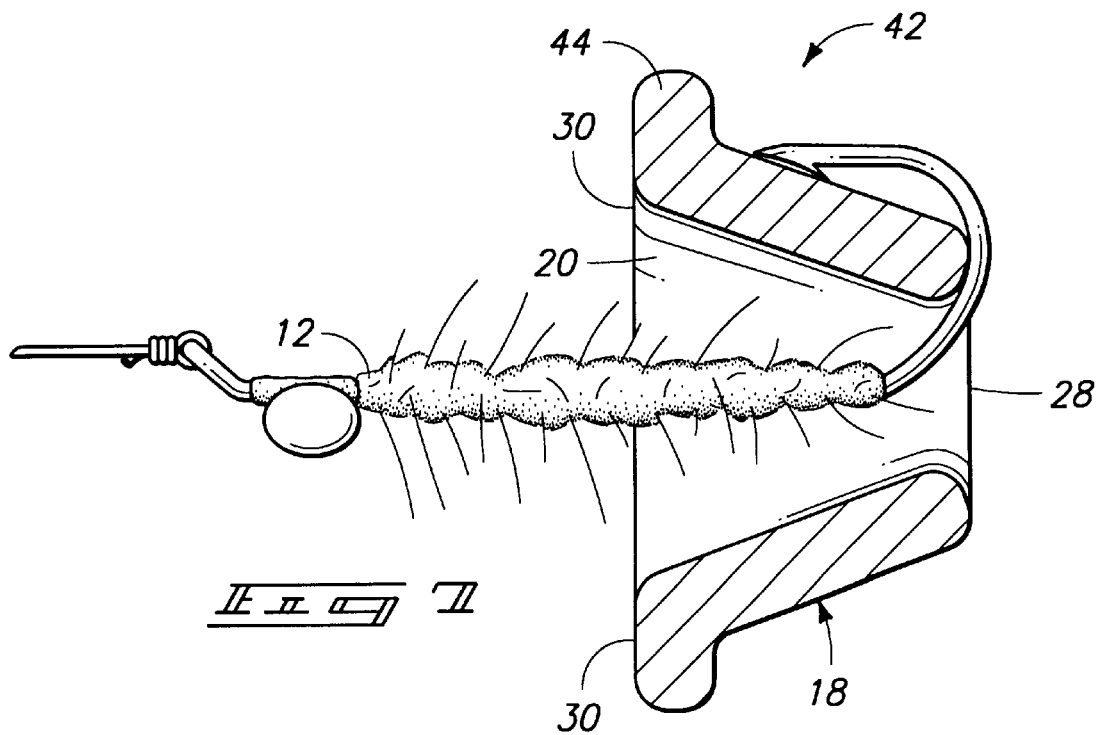

FISH HOOK REMOVER

TECHNICAL FIELD

The present invention relates to removal of fish hooks from fish and more particularly to a device for accomplishing such removal.

BACKGROUND OF THE INVENTION

There is an increasing effort on the part of many sports fishermen to release caught fish. However, many species are very fragile and can easily die if removed from the water and handled roughly for the purpose of removing hooks. Barbless hooks have been used to ease the removal effort and to minimize injury to released fish. However many fish still die from exposure to air and extended handling during the hook removal process.

In an attempted solution to the problem, hook removers have been developed to minimize the time and efforts required to remove hooks. While some have indeed helped save many fish, the time required for hook removal is still significant, as is required handling of the fish.

An exemplary improved hook remover is disclosed in U.S. Pat. No. 5,644,865; granted on Jul. 8, 1997 to Harrison et al. The Harrison hook remover includes a handle with a slotted tubular structure at one end. The tube configuration is angularly oriented to the handle and the slot, which extends the full length of the tube, opens along a flat line guide surface that is formed into the handle.

The Harrison tube is circular in cross section and, in at least one commercial version, is approximately ¾ inch long. The bore within the tube is approximately ⅛ inch in diameter. Thus the bore dimension is significantly less than the tube length (approximately 17% of the tube length). While the device is functional, the small bore diameter, long tube length, orientation and shape of the slot, and the single line guide surface lead to difficulties in use.

Firstly, the circular nature of tube and the slot length, and the singular line guide surface contribute to difficulties in attaching the remover to a fish line. The line must be tight and straight in order to be received in the long, straight slot. Further, the device must be accurately oriented in relation to the line for the guide surface and slot to properly receive the line. This means the line must be held tight, usually by one hand, and either the line or the hook remover must be maneuvered into the right orientation for engagement with the single line guide surface before the line can be guided into the tubular section. This is not an easy task especially if the fish is fighting to be free.

Secondly, the small diameter of the tube bore will not accept many different size fly bodies or hook sizes. Since the tube bore is intended to be slidably received over the hook shank (and fly body in the case of a fishing fly), separate size removers become advisable for different size hooks and flies. This becomes an inconvenience for those who fish with different size hooks and flies.

Thirdly, the straight axial slot in the tubular member requires that the fisherman be careful not to line up the slot with the bend of the hook, because the tube could easily slide off the hook during the thrust required to disgorge the hook barb and require re-threading of the line onto the tubular member. The hook would remain in the fish, the end of the remover could gouge into the fish, and the user would be required to once again thread the remover onto the fish line and repeat the removal effort. All this significantly increases the possibility that the fish will be injured.

Even with the above disadvantages, the Harrison hook remover represents an improvement over the older style long nose pliers, and bulbous plastic hook disgorges that were used in the past. Still, it is obvious that further improvements are desirable.

Aside from removing hooks from fish, forms of removal tools have been developed for removing hooks from submerged objects such as logs. One such device is a lure retriever that includes an elongated helical-spiral wire is mounted at the end of an extendable pole. To remove a hook from a submerged object, the user turns the spiral end around the fish line, then slides the end along the line to the lure. A thrust of the device serves to dislodge the hook. Upon retrieval, the user must unwind the line or lure from the wire. This device would not be serviceable for catch and release hook removal from fish, mainly because the wire must be turned around the line; and the long shaft, being substantially coaxial with the helical spiral is not conducive to hook removal from fish.

As a solution to the above problematic issues, the present invention has for an objective, provision of a hook remover that is easy and reliable for use in quickly removing hooks from fish.

Another object is to provide such a hook remover that may be used on a wide variety of hook and fly sizes.

A further objective is to provide such a hook remover that cannot be easily removed from the line during a thrusting motion to remove the hook or from angling the remover to dislodge the hook.

These and still further objectives and advantages may become apparent from the following description of preferred embodiments of my invention.

BRIEF DESCRIPTION OF THE DRAWINGS

Preferred embodiments of the invention are described below with reference to the following accompanying drawings.

FIG. 2 is a fragmented side elevational view of the form shown in FIG. 1;

FIG. 3 is an enlarged end view;

FIG. 4 is a fragmented view of another preferred form of the present fish hook remover;

FIG. 5 is a fragmented view of a further preferred form of the present fish hook remover;

FIG. 6 is an enlarged view illustrating properties of the fish hook remover embodiment shown in FIG. 5; and FIG. 7 is an enlarged view illustrating properties of the fish hook remover embodiment shown in FIG. 6.

DETAILED DESCRIPTION OF THE PREFERRED EMBODIMENTS

Figure 1:
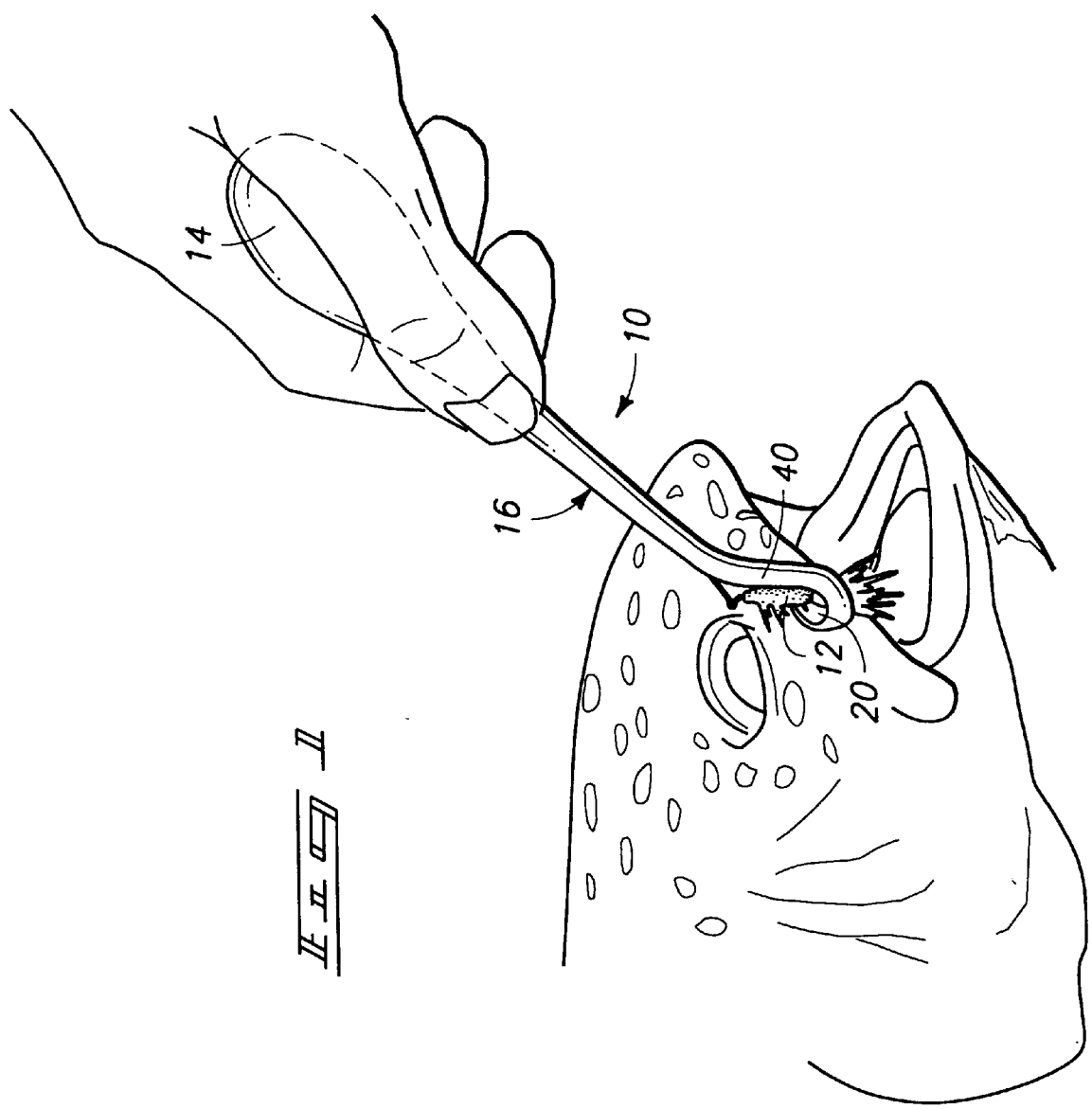
FIG. 1 is a perspective view showing a preferred form of my fish hook remover in operation.

This disclosure of the invention is submitted in furtherance of the constitutional purposes of the U.S. Patent Laws "to promote the progress of science and useful arts" (Article 1, Section 8).

A fish hook remover, several embodiments of which are shown in the accompanying drawings, is designated here and within the drawings by the reference numeral 10. The purpose of the present fish hook remover 10 in any of the exemplified forms, is to enable quick and effective removal of a fish hook 12 from a fish (FIG. 1).

It is preferred that forms of the present hook remover 10 be formed of metal by casting processes. Preferred metals include steel (most preferably stainless steel) or bronze, though other materials could be used. Stainless steel is preferred for strength and its capability to resist corrosion. Bronze is preferred for salt water use. In either situation, the particular configurations illustrated are preferably molded, using conventional casting techniques.

In preferred embodiments, the present hook remover 10 generally includes a handle 16 with a hand grip section 14 (FIG. 1) at a rearward end and a shank 40 at a forward end. A spiral flight 18 on the handle is generated about an axis A (FIGS. 2 and 3) through an angle that is greater than approximately 360°. The flight may be made integral with the handle 16 and be formed in a flat or somewhat rounded configuration to be complimentary to the curve of a fish hook.

The spiral flight 18 is wrapped on itself to define a central hook shank receiving opening 20 having an effective cross sectional dimension D (FIG. 3) that is normal to the axis A. The size of the central hook shank receiving opening 20 may be varied according to need. Hook removers 10 with larger central openings may be produced for use with large tackle, smaller for small tackle. However a single size may be made that will be serviceable for a wide size range of tackle. In one example, an opening size of approximately ¼ inch will accommodate a range of hooks from size 20 to size 2 or larger, since the upper limit is determined only by the line and hook shank size.

A line guide opening 22 (FIG. 3) is defined by the flight 18 and is formed according to the spiral shape of the flight. The line guide opening extends from an outward open end 24 along the handle to an inward end 26 that opens tangentially into the central hook shank receiving opening 20. The outward end 24 is substantially parallel to the handle 16 (more specifically toward a shank portion 40 of the handle) to receive a fish line by way of a simple lateral movement of the hook remover toward a fish line.

The distance between "wraps" of the flight 18 defines the radial dimension of the line guide opening 22, which is preferably approximately consistent between the ends 24, 26. This distance is necessarily greater than the fish line diameter, but need not be greater than the diameter of the shank of a hook to be removed.

In the preferred embodiments, the flight 18 spans an axial distance "W" (FIG. 2) between a forward surface 28 and a rearward surface 30 that is less than the effective cross sectional dimension "D" (FIG. 3) of the hook shank receiving opening 20. This relationship significantly simplifies attachment of the flight to a fish line. Even relatively limp, curled line can be easily captured since there is no long slot for the user to align with a straight section of line.

Further, the flights 18 of preferred embodiments include line guide surfaces 32 that lead in the spiral configuration tangentially (FIG. 3) into the central hook shank receiving openings 20. A fish line engaged laterally (with respect to the long dimension of the line) by a guide surface 32 may be easily and smoothly guided into the central hook shank receiving opening 20 by simple, short lateral movement of the hook remover. The flight surface opposite the line guide surface will also help accomplish this function, as may surface portions of the handle adjacent to the flight and outward end 24 of the line guide opening 22.

It is noteworthy that a fish line may be received within the central hook shank opening 20 without requiring rotation of the hook remover.

To achieve the above function, and yet prevent unintentional disengagement of the line, preferred embodiments of the present hook remover 10 include flights 18 that extend in a spiral configuration with respect to axis A, through an angle greater than 360°. In preferred aspects, the angle is greater than 360° but less than 720°.

FIG. 3 best demonstrates the above parameters. In the illustrated example, the flight 18 extends as a spiral about the axis A with a first spiral coil section 34 angularly spanning 360° about the axis starting from the handle 16. A second spiral coil section 36 is integral with the first coil section 34 and extends therefrom and in the same direction about the axis A from the first coil section 34 through an angle less than 360° to a free end 38.

In the illustrated example, the second section 36 includes an angle about the axis A of approximately 80°, thereby extending the entire flight through an angle to the free end 38 of 440° (first section 34 being 360° plus 80° for the second section 36). Thus the line must only traverse a short lateral distance (relative to the remover 10) from the open outward end 24 of the line guide opening 22 to exit through the inward end 26 and into the central opening 20.

If the second section spans a greater angular distance, more lateral movement of the line will be required as the distance from the outward open end 24 to the inward end 26 will be increased. Still, even if the second section approaches 360° to the free end 38 (making the total angular displacement of the spiral approach 720°), a line may be attached without requiring rotation of the remover about the line. However, further extension of the second section (bringing the total angle beyond 720°) will require that the remover be rotated to capture the fishing line and reverse rotation will be required to release the line. This is undesirable.

In one aspect, the flight is formed in such a manner that it over-wraps itself. In other words, the first coil section 34 at least partially overlaps the second coil section 36 along the axis A. In fact it is possible that the forward and rearward surfaces 28, 30 could be formed to lie in substantially parallel planes, and that such planes could be normal to the axis A. This is not necessary, but it is desirable to avoid a helical configuration along the axis.

In preferred forms of the present hook remover, the handle includes a shank 40 at a forward end of the hand grip section 14 of the handle. It is advantageous that the shank part 40 be oriented at an obtuse angle to the handle, as indicated by the angle X in FIG. 2. It is also preferred that the spiral hook engaging flight 18 be formed on the shank 40, generated about the axis A which is substantially parallel to and offset from the shank 40. As shown, at least part of the forward surface of the spiral flight 18 is disposed in a plane that is approximately perpendicular to the shank section (see the angle P in FIG. 2). The angled shank 40 facilitates application of leverage for hook removal. The offset orientation of the spiral flight 18 is provided to keep the hand grip 14 and shank 40 clear of the fish line to facilitate capture of the line and sliding of the spiral flight along the line without interference by the user's hand.

It is also pointed out that the shank part 40 and flight 18 could be produced separately from the hand grip 14. Such a configuration could enable attachment of the shank and flight to numerous forms of hand grips, either for utilitarian or decorative purposes.

Preferred embodiments of the present remover may be produced with a barb concealing surfaces 42 on the flight 18. Two examples of such surfaces 42 are illustrated. In FIGS. 4 and 6, a ridge 44 is formed along the flight 18, projecting outwardly therefrom with respect to the central opening 20.

To further facilitate usage of the ridge, it is preferable that the flight 18 be of a somewhat conical form as shown. FIG. 6 illustrates, the ridge 44 in relation to a hook barb and/or point (hereafter barb) extending outwardly of the barb to protect against the re-hooking as the hook is removed.

In FIGS. 5 and 7 another form of barb concealing surface 42 is exemplified. Here, at least one and preferably several barb receiving indentations 46 are formed in the flight, opening outwardly with respect to the central opening 20. As shown in FIG. 7, the indentations are deep enough to receive a hook barb, also preventing the barb from re-hooking a fish as the hook is removed. FIGS. 5 and 7 also illustrate a further aspect in which an axially oriented recess 48 on the forward surface 28 of the flight 18, leading to each barb receiving indentation 46. The recesses serve to guide or cam the hook barb toward and into the associated indentation as the hook is engaged by the forward surface 28.

Operation with any form of the present hook remover 10 is simple and convenient process. First the user must capture the line in the central opening 20 of the flight 18. This is done simply by grasping the handle 16 and moving the remover laterally (with respect to the line) against the fish line so the line will engage the line guide surface 32 of the spiral flight. It is pointed out that it is not necessary that the line be taut to accomplish this function.

The curvature of the line guide surface 32 will guide the line smoothly into the line guide opening 22. Continued lateral motion in the same direction will force the line along the opening 22 through the inward end 26 of the opening and into the central opening 20. This may be done as a simple movement of the user's wrist.

Next, the user simply slips the remover along the line toward the hook. The central hook shank receiving opening 20 will allow the flight 18 to be slipped over the body or shank of the hook to a point where the forward flight surface 28 engages the curve of the hook. A forward thrust or slight tipping motion of the handle will typically disgorge the hook barb, and the hook can be retracted from the fish.

If embodiments of the present remover 10 are used in which barb concealing surfaces are provided, the user may simply slide the hook outward along the same axis as the line. If such surfaces are not provided, the user may simply angle the remover 10 to hold the barb away from the adjacent tissues and hold that angle while moving the hook and remover away from the fish to avoid re-hooking.

It is pointed out that because the flight 18 extends about an angle greater than 360°, that the forward flight surface 28 facing the hook is continuous. That is, there is no open slot exposed to the hook that could allow the hook to slip through during the removal process. This is a distinct advantage over prior slotted hook removers that require the user to turn the slot away from alignment with hook for purposes of hook removal.

The above steps may take very little time (seconds) before the fish is free of the hook. In fact, there is little if any need for the fisherman to touch or even remove the fish from the water. Thus an extremely effective, quick and safe hook removal process is performed that will result in little if any injury to the fish.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A fish hook remover, comprising:
    a handle;
    a spiral flight on the handle, generated about an axis through an angle greater than approximately 360° and extending to an inner end;
    wherein the spiral flight defines a central hook shank receiving opening having an effective cross sectional dimension normal to the axis;
    a a spiral line guide opening that spirals according to the spiral flight and opens tangentially into the central hook shank receiving opening;
    wherein the flight spans an axial distance between a forward surface and a rearward surface that is less than the effective cross sectional dimension of the hook shank receiving opening; wherein the inner end is spaced radially from and located along the axis within the spiral flight; and
    wherein the flight includes a line guide surface leading in the spiral configuration tangentially into the central hook shank receiving opening such that a fish line engaged laterally by the flight may be guided into the central hook shank and extending to and enclosing an inner end; wherein the inner end is spaced radially from and located along the axis within the spiral flight; receiving opening.

2. A fish hook remover as defined by claim 1, wherein the angle is less than approximately 720°.

3. A fish hook remover as defined by claim 1, wherein the flight is comprised of a first spiral coil section angularly spanning 360° about the axis starting from the handle and a second spiral coil section integral with the first coil section and extending therefrom about the axis from the first coil section through an angle of less than 360° to a free end.

4. A fish hook remover as defined by claim 1, wherein the flight is comprised of a first spiral coil section angularly spanning 360° about the axis starting from the handle and a second spiral coil section integral with the first coil section and extending therefrom about the axis from the first coil section through an angle less than 360° to a free end; and
    wherein the first coil section axially overlaps the second coil section.

5. A fish hook remover as defined by claim 1, wherein the is flight is formed of a cast metal.

6. A fish hook remover as defined by claim 1, wherein the flight is formed of cast steel.

7. A fish hook remover as defined by claim 1, wherein the flight is formed of cast bronze.

8. A fish hook remover as defined by claim 1, wherein the handle includes a shank section and wherein at least part of the forward surface of the spiral flight is disposed in a plane that is approximately perpendicular to the shank section.

9. A fish hook remover as defined by claim 1, wherein the handle includes a hand grip section and shank section between the hand grip section and flight;
    wherein the shank section is angularly offset from the hand grip section; and
    wherein at least part of the forward surface of the spiral flight is disposed in a plane that is substantially perpendicular to the shank section.

10. A fish hook remover as defined by claim 1, wherein the handle includes a hand grip section and shank section between the hand grip section and flight; and wherein the shank section is angularly offset from the hand grip section.

11. A fish hook remover as defined by claim 1, wherein the handle includes a hand grip section and shank section between the hand grip section and flight; and wherein the shank section is angularly offset from the hand grip section by an angle greater than 90° and less than 180°.

12. A fish hook remover as defined by claim 1, further comprising a barb concealing surface on the flight.

13. A fish hook remover as defined by claim 1, further comprising a barb concealing surface on the flight including a ridge formed along the flight projecting outwardly therefrom with respect to the central opening.

14. A fish hook remover as defined by claim 1, further comprising at least one barb concealing surface on the flight including a barb receiving indentation formed in the flight and opening outwardly with respect to the central opening.

15. A fish hook remover as defined by claim 1, further comprising at least one barb concealing surface on the flight including an axial barb receiving indentation formed on the flight and opening outwardly with respect to the central opening; and an axially oriented recess on the forward surface of the flight, leading to each barb receiving indentation.

16. A fish hook remover, comprising:

a handle;

a shank at a forward end of the handle oriented at an obtuse angle to the handle a spiral hook engaging flight on the shank, generated about an axis that is substantially parallel to and offset from the shank;

a central hook shank receiving opening defined by the flight;

a spiral line guide opening defined by the flight that spirals into the central hook shank receiving opening such that a fish line engaged laterally by the flight will be guided into the central hook shank receiving opening.

17. A fish hook remover as defined by claim 16, wherein the spiral line guide opening includes an outward open end that is defined by the shank and flight, and that is substantially tangential to the shank.

18. A fish hook remover as defined by claim 16, wherein the spiral line guide opening includes an inward open end that is defined by the flight, and that is substantially tangential to the central hook shank receiving opening.

19. A fish hook remover as defined by claim 16, wherein:

the spiral line guide opening includes an outward open end that is defined by the shank and flight, and that is substantially tangential to the shank; and the spiral line guide opening includes an inward open end that is defined by the flight, and that is substantially tangential to the central hook shank receiving opening.

20. A fish hook remover, comprising:

a handle;

a spiral hook engaging flight on the handle, generated about an axis offset from the handle through an angle greater than 360° and less than 720° and extending to and enclosing an inner end;

wherein the flight includes a forward surface and a rearward surface axially spaced by a width dimension;

a central hook shank receiving opening formed about the axis and defined by the spiral configuration of the flight and having a cross sectional dimension measured normal to the axis and greater than the axial width dimension; wherein the inner end is spaced radially from and located along the axis within the spiral flight;

wherein the flight includes an integral line guide surface leading tangentially into the central hook shank receiving opening such that a fish line engaged by the line guide surface may be guided into the central hook shank receiving opening.

\* \* \* \* \*